United States Patent [19]

Knels

[11] Patent Number: 4,537,549
[45] Date of Patent: Aug. 27, 1985

[54] BALE CARRIER

[76] Inventor: Kenneth J. Knels, Rte. #2 Box 93A, Fairview, Mont. 59211

[21] Appl. No.: 610,196

[22] Filed: May 14, 1984

[51] Int. Cl.³ .............................................. A01D 87/12
[52] U.S. Cl. .................................... 414/24.5; 414/703; 414/722
[58] Field of Search ...................... 414/24.5, 24.6, 685, 414/703, 721, 722

[56] References Cited

U.S. PATENT DOCUMENTS

| | | | |
|---|---|---|---|
| 2,670,089 | 2/1954 | Paterson | 414/703 |
| 2,671,570 | 3/1954 | Richey | 414/722 |
| 2,791,340 | 5/1957 | Haines et al. | 414/703 |
| 3,876,090 | 4/1975 | Holland | 414/703 X |
| 3,957,167 | 5/1976 | Jacobson et al. | 414/703 |
| 3,967,742 | 7/1976 | Meinert | 414/24.5 |
| 4,037,741 | 7/1977 | Smith | 414/24.5 X |
| 4,040,534 | 8/1977 | Kenworthy | 414/703 |
| 4,042,141 | 8/1977 | Schweigert | 414/703 |
| 4,091,947 | 5/1978 | Fischer | 414/703 |
| 4,306,825 | 12/1981 | Yilit | 414/703 X |
| 4,318,653 | 3/1982 | Benefield et al. | 414/24.5 |
| 4,340,240 | 7/1982 | Anderson | 414/703 X |

FOREIGN PATENT DOCUMENTS

| | | | |
|---|---|---|---|
| 55-148830 | 11/1980 | Japan | 414/703 |
| 179788 | 6/1962 | Sweden | 414/721 |
| 729416 | 5/1955 | United Kingdom | 414/703 |
| 942139 | 11/1963 | United Kingdom | 414/685 |

Primary Examiner—Leslie J. Paperner
Attorney, Agent, or Firm—Robert C. Baker

[57] ABSTRACT

The bale carrier is of elongated character for three-point hitch mounting on a tractor. It is a double bale carrier and comprises a unitary elongated mainframe having a rectangular perimeter the longer sides of which are formed by a lower horizontal base bar and an upper header bar and shorter sides of which are formed by end plates lying perpendicularly to the base and header bars. An interior frame structure consists essentially of two spaced apart interior plates and X braces in cooperative relationship between the interior plates and end plates. Three-point means for hitch mounting is provided. Carried on the mainframe are two pairs of bale-supporting teeth pivotally mounted underneath the bas bar and extending perpendicularly outward. Each tooth preferably extends outward from a base bar location proximate to a plate of the mainframe. A heel continuation of each tooth terminates within a pivot-limiting frame depending downwardly from a location proximate to the side of the mainframe opposite that from which the teeth project.

17 Claims, 4 Drawing Figures

BALE CARRIER

BACKGROUND OF THE INVENTION

This invention relates to a bale carrier of elongated character for three-point hitch mounting on a tractor so as to extend transversely to the direction of travel by the tractor, and more particularly relates to a bale carrier of the aforenoted type having a unique frame and relationship of elements for carrying more than one bale.

The baling of hay into large cylindrical bales weighing as much as about 1500 pounds or even possibly more has become widespread; and the use of tractormounted devices to lift and move these bales is known. However, the tractor-mounted devices as heretofore available have in most instances been designed for the pickup and movement of a single bale, which is a waste of the power and capability of the tractors of large size so frequently used nowadays. In those few known instances where attempts have been made to form a tractor-mounted device capable of picking up and moving more than one bale, the features of the resulting device have been quite different from those of this invention; and it is opined that amongst other things they have inadequate provision for the stresses and strains that are encountered as the bales are picked up and moved.

A primary feature of this invention is that of the special arrangement of frame elements to distribute the stresses and strains caused by the weight of handling more than one of these huge bales.

An especially advantageous feature of the invention is that of the adaptation of the tooth members of the bale carrier for travel next to the ground during bale pickup operations even when the ground may vary somewhat in its level at a resting bale site.

Other advantages and benefits of the invention and the relationships taught herein will become evident as this description proceeds.

SUMMARY OF THE INVENTION

The new bale carrier of the invention is of elongated character and is especially designed for three-point hitch mounting on a tractor so as to extend transversely to the direction of travel by the tractor.

The bale carrier has a unitary elongated mainframe. This mainframe has a rectangular perimeter and the longer members of this rectangular perimeter are formed by a lower horizontal base bar which has an upper inwardly facing surface of generally plate-like character and an upper header bar which has a lower inwardly facing surface of generally plate-like character. The shorter members of the rectangular perimeter are formed by end plates lying in planes perpendicular to the base and header bars. Thus the inwardly facing surfaces of the rectangular perimeter of the mainframe have or comprise plate-like surfaces. The members of the rectangular perimeter have opposed transversely outward surfaces characterized as a face side surface on one side and a far side surface on the other.

Further, the mainframe has an interior frame structure comprising and preferably consisting essentially of two spaced apart interior plates and two X braces. The interior plates are not only spaced from each other but also from the end plates. Each of the interior plates lies in a plane parallel to the planes of the end plates. Each is united to the base and header bars. The two X braces are of substantially equal character. One X brace is between one end plate and the interior plate most adjacent the one end plate; and the other X brace is between the other end plate and the interior plate most adjacent said other end plate. Each lower arm of each X brace is united at its terminus to the base bar at an intersection formed by a plate and the base bar; and each upper arm of each X brace is united at its terminus to the header bar at an intersection formed by a plate and the upper header bar. In the most preferred embodiment, it is very significant that the lower arm members are so united at a location proximate to the far side surface of the base bar of the perimeter frame, the far side being the side of the base bar opposite the side from which the tooth members of the bale carrier project outwardly. Further, in the preferred embodiment the upper arms of the X braces are so united at a location proximate to the face side surface of the header bar, that is the side of the perimeter frame from which the tooth members project. The central portions of the elongated mainframe embracing the two interior plate members is appropriately characterized as the medial portion of the mainframe.

The three-point means for receiving a threepoint hitch of a tractor consist essentially of an upper bracket means medially located on the header bar for receiving the upper link of the three-point hitch and a pair of spaced lower bracket means united to the base bar for receiving the pair of lower links of the three-point hitch. Each lower bracket means of the pair is preferably formed by the combination of an ear member and an interior plate in cooperatively spaced relationship, and with each (that is with the ear and the plate) having a bore or hole for receiving a pin for locking the lower links of the three-point hitch in place.

Bale-supporting teeth are mounted on the base bar, preferably in a manner for vertical floating capability. They extend perpendicularly outward from a location below the face side surface of the base bar. Preferably two pairs of bale-supporting teeth are employed; and each pair is adapted to carry a bale. Each tooth is preferably pivotally mounted for vertical pivot movement or float at bracket means depending downwardly from a location proximate to the face side surface of the base bar; and each tooth has a heel continuation thereof which extends underneath the base bar and more or less terminates within a pivot-limiting frame depending downwardly from a location on the base bar proximate to the far side surface of the base bar.

In the most preferred structures of the invention, the teeth project outwardly from locations proximate to plate members of the mainframe. Thus, the relationship between the forces of stress and strain in lifting and tilting and carrying bales are concentrated at the plate member sites of the mainframe and, interestingly, the heel continuation of the teeth places a portion of those forces near the far side surface of the base bar and transmits those forces through the X braces as well as the vertical plate members of the mainframe in the lifting, tilting, and carrying action.

DESCRIPTION OF PREFERRED EMBODIMENT

Figure 1:
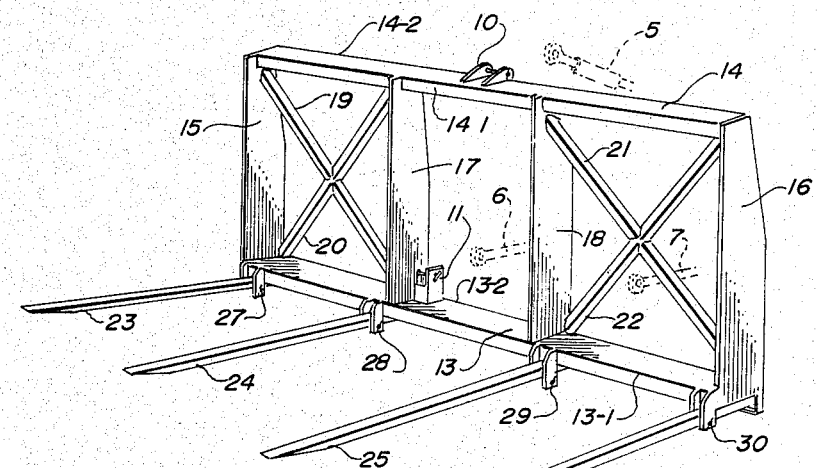
FIG. 1 is a schematic perspective view of a double bale carrier according to the invention, with a three-point hitch means shown spaced away and in phantom.

Referring particularly to FIG. 1, the three-point hitch of a tractor is illustrated as having an upper link 5 and a pair of lower links 6 and 7. These links normally are between the rear drive wheels of a farm tractor and are readily accessible or usable for mounting the bale carrier of the invention thereupon. Each link suitably has at its terminus a ring or doughnut-shaped body through which a pin or shaft may be inserted. To be recognized is the fact that each of these links conventionally has hydraulic means associated therewith (not shown), or sometimes has mechanical means associated therewith, for the purpose of adjusting their location. The adjustment of location for these links is controlled by means mounted on the tractor for convenient reach by an operator. Significantly, the lower links 6 and 7 may be adjusted in height by the means controlled by an operator; and the upper link 5 is readily adjustable by an operator not only in height but also in a linear direction for the purpose of tilting the bale carrier of the invention, as desired for convenient carrying of bales from one location to another.

Figure 3:
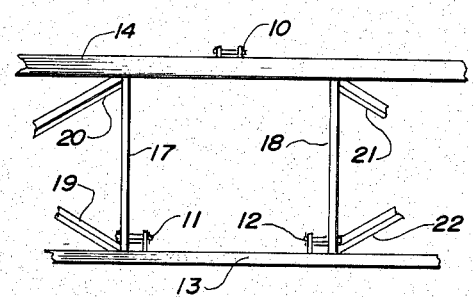
FIG. 3 is a fragmentary plan view of the central or medial portion of the bale carrier, illustrating the relationship of elements at that medial portion.

Three-point means for the three-point tractor hitch are fixed in a rigid or unified manner on the bale carrier of the invention; and the three-point means comprises or consists of an upper bracket means 10 and a pair of spaced lower bracket means 11 and 12 (see FIGS. 1 and 3). The upper bracket means suitably consists of two spaced ear members projecting generally outward in a perpendicular manner and generally off the far side surface of the upper header bar 14 at a central location along the length of that header bar. The ring of the upper link 5 is adapted to be received between these ear members and then locked between them by inserting a pin through the assembly. The lower links 6 and 7 likewise are attachable to the lower brackets 11 and 12 in a similar manner. Details for the preferred structure of the lower brackets involve a double function for interior plates of the mainframe and will be discussed after covering details of the mainframe.

The mainframe is unitary and elongated and has a rectangular perimeter. The longer members of the rectangle are formed by a lower base bar 13 and an upper header bar 14; and the shorter members are formed by end plates 15 and 16. To be recognized is that there is a thickness characteristic to the mainframe; and for convenience, the side off which the teeth project from the mainframe is referred to as the face side and the opposite side is referred to as the far side. Thus, the side surfaces of the base bar 13 are labeled as a face side surface 13-1 and a far side surface 13-2. Likewise, the side surfaces of the header bar 14 are labeled as a face side surface 14-1 and a far side surface 14-2. Note that, in the preferred structure, the upper inwardly facing surface of the base bar 13 is essentially flat and is characterized as having a plate-like character. Likewise, the inwardly facing surface (not shown) of the header bar is essentially flat and has a plate-like character. The importance of these flat or plate-like inwardly facing surfaces of the base and header bars is significant for the particular location of the arms of the X braces in the most preferred embodiment of the invention. Here to be stressed is that the inwardly facing surfaces of the base and header bars comprise flat or plate-like surfaces; portions of those surfaces may have other cross-sectional contours. Even in the most preferred embodiment, the plate-like character for the inwardly facing surfaces may be bordered by ridges or the like, if desired. Recognize also that the end plates 15 and 16 have perimeters which extend from the face side to the far side surface of the mainframe. However, the header bar is generally of smaller distance than the base bar between the face side surface and the far side surface. Thus, plates 15 and 16 appropriately may be narrowed at their upper extremity as shown. Also, the plates may have portions of their interiors removed, although that is not preferred. Further, the header bar is preferably located toward the face side of the composite thickness of the mainframe, as illustrated. Illustratively, a base bar may be formed of U-shaped channel iron having an upper plate width of about 25 cm. (10 inches) and depending sides of about 7 cm. (3 inches). A suitable header bar may be formed of square iron tubing about 10 cm. (4 inches) on each side. Thicknesses of walls of about one centimeter are useful. As for the plates, they may be formed of iron sheets of about 0.8 cm. or ⅜ inch thick. Other thicknesses than those aforenoted can also be useful.

The interior frame structure of the mainframe has two interior plates 17 and 18 as well as two X braces. Angle irons or rods 19 and 20 comprise one X brace and those labeled 21 and 22 comprise the other. The interior plates are not only spaced from each other but also spaced from the end plates. Each interior plate lies in a plane parallel to the planes of the end plates. One X brace formed by the rods 19 and 20 is between one end plate 15 and the interior plate 17 most adjacent the end plate 15. The other X brace formed by rods 21 and 22 is between the end plate 16 and the most adjacent interior plate 18. Each X brace has the terminus of its lower arm united to the base bar at an intersection or point of juncture of a plate with the base bar 13; and likewise, the upper arm extensions or parts of the rods forming the X braces are united at their termini to the header bar at the juncture or intersection of a plate with the header bar 14. Observe that the teeth 23, 24, 25, and 26 project outwardly from a location beneath the base bar 13 and at locations quite proximate to plate members 15, 17, 18, and 16. In the most preferred embodiment, the terminus of the lower arms of each X brace is welded to the base bar at a location proximate or toward the far side 13-2 of the base bar (and also proximate to plate intersections, as illustrated). Inherently therefore, when header bars of less distance between the face and far side are employed as compared to that distance for base bars, as is preferred, and with the header bar 14 preferably relatively located toward the face side of the bale carrier, the upper terminus of the X braces (joined to the header bar at the juncture or intersection of the plates 15, 17, 18, and 16 with the upper or header bar 14) are at a location toward the face side surface of a composite bale carrier. Thus the X braces generally slant from their lower arm portions to their upper arm portions; and the slant is toward the face side of the composite bale carrier. The slant is highly desirable for the distribution of the stresses and strains encountered in carrying bales; and most preferably the upper terminus of each arm of the X braces is welded to the header bar (at the juncture of plates with the header bar 14) near the face edge or side of the header bar 14.

The portion of the mainframe where the two interior plates 17 and 18 are located is appropriately characterized as the medial portion. This medial portion is also more or less between the locations of the medial teeth 24 and 25 (which teeth support the inward edge of bales to be carried by the apparatus). The three-point means for receiving hitching means of a tractor is located in essence at this medial portion.

Figure 2:
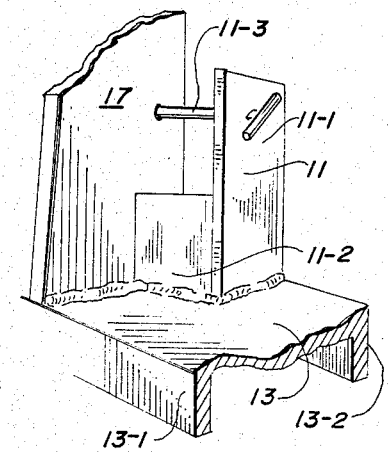
FIG. 2 is a fragmentary enlarged schematic view of one lower bracket means for receiving a lower link of the three-point hitch.

Referring particularly to FIGS. 2 and 3, observe that the lower bracket means 11 and 12 or the lower links of the three-point hitch are formed in a manner taking advantage of the presence of the interior walls 17 and 18. Thus the interior walls 17 and 18 perform a double function, namely that of providing a frame means for absorbing or distributing forces within the mainframe and also that of functioning as one of the ear elements for lower brackets 11 and 12. Bracket 11, which can be taken as a mirror image of bracket 12, has a reinforcing wall or small plate 11-2 extending between the upwardly projecting wall-like ear 11-1 and the interior wall 17. The reinforcement 11-2 is also welded to the upper surface of the base bar 13. A bore or hole in the ear wall 11-1 as well as in the interior wall 17 provides sites for slipping a pin 11-3 through the same for mounting the lower link such as link 6 in a manner providing or allowing for pivot of the bale carrier at that mounting.

Figure 4:
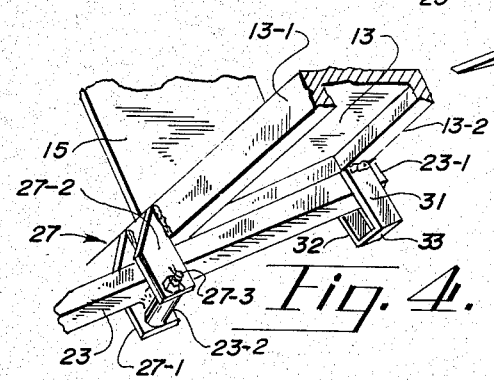
FIG. 4 is a fragmentary schematic perspective view looking upwardly from underneath the base bar of the bale carrier and illustrates the pivot mounting for a tooth of the bale carrier and the fact of the pivotal floating character for the tooth and the pivot-limiting frame which confines or limits the pivot or float of the tooth.

Refer now particularly to FIG. 4 and to the pivot mounting 27 for the tooth 23 as illustrated in FIG. 1. Discussion of this illustrative mounting applies equally to the characteristics of each mounting for the teeth 23, 24, 25, and 26, and illustrates also the characteristic of limits of pivot at all pivot mountings 27, 28, 29, and 30. Brackets are formed by ear members 27-1 and 27-2. These ear members suitably are welded at a spaced relationship and in a depending relationship from the face surface 13-1 of the base bar 13. Ear brackets 27-1 and 27-2 extend below base bar 13 and may even be located underneath the base bar 13, but always at a location near or proximate to the face surface 13-1. The important point is that the illustrative ears 27-1 and 27-2 are below the level of base bar 13. They depend downwardly from the base bar 13 and at a location proximate or near the face surface 13-1 of the base bar 13. The illustrative tooth 23 has welded to its underside a section of a pipe or sleeve 23-2; and through this pipe or sleeve 23-2 as well as through appropriate bores or holes in the ears 27-1 and 27-2 extends a pin for pivotally mounting the tooth 23. Observe that a heel continuation 23-1 of the tooth 23 extends underneath the base bar to the far side 13-2 of the base bar. Underneath the far side is fixed a pivot-limiting frame suitably consisting of an enclosed bracket or U-shaped member formed by legs 31 and 32 and cross member 33. Within this enclosed bracket the terminal end of the heel portion 23-1 of the tooth 23 is adapted to float as that tooth 23 pivots vertically at the pivot 27. The enclosed bracket serves as a pivot-limiting frame for the floating action of the tooth 23. Thus the tooth 23 (as well as the other teeth) is mounted to float pivotally in a vertical plane within the limits set by the pivot-limiting frame consisting of elements 31, 32, and 33. Equivalent mountings for tooth members may of course be employed. The important feature for this preferred arrangement is that of allowing each tooth to pivot in the vertical plane and thus enhance the tendency of the teeth to follow the level of the ground as the bale carrier is moved by a tractor during the step of placing the teeth underneath a bale resting on the ground for the purpose of picking that bale up and moving it.

Thus has been described a double bale carrier wherein the teeth are at the lowermost point on the bale carrier and are located in spaced relationship along the elongated length of the bale carrier so as to place the strain and stresses of bale lifting and movement substantially at the location of wall members 15, 17, 18, and 16 of the double bale carrier. Further, the heel portion of each tooth is not only proximate to a wall of the mainframe but also proximate to the terminus of the lower arms of the X members of the mainframe; and this further contributes to the distribution of the stress and strain caused by the weight of the bale. Significantly, in the preferred embodiment, the X members not only contribute to a triangulation type bracing, but also transmit and re-distribute the pressures caused by the heel 23-1 through the arms of the X members to the header bar 14 (and most preferably toward the face edge of the header bar 14). Both the vertical walls 15, 17, 18, and 16 of the mainframe and the X members also contribute to the transmission of the stresses and strains to the header bar and cause significant contribution by the header bar as a carrying member for stresses and strains arising in the mainframe.

It will be appreciated that the invention may be embodied in other specific forms than the illustrated most preferred embodiment without departing from the spirit or essential characteristics thereof. Thus the present embodiment is to be considered in all respects as illustrative and not restrictive, the scope of the invention being indicated by the appended claims rather than by the foregoing description. Further, changes which come within the meaning and range of equivalency of the claims as construed for validity are intended to be embraced thereby. In this respect, it is emphasized that the term plate member is intended to convey and emphasize the important feature of a thickness or distance between the face and far edge surfaces of the bale carrier.

That which is claimed is:

1. A bale carrier of elongated character for three-point hitch mounting on a tractor so as to extend transversely to the direction of travel by the tractor, comprising a unitary elongated mainframe having a rectangular perimeter the longer members of which are formed by a lower horizontal base bar which has an upper inwardly facing surface of generally plate-like character and an upper header bar which has a lower inwardly facing surface of generally plate-like character, and the shorter members of which are formed by end plates lying in planes perpendicular to the base and header bars, the members of said rectangular perimeter having opposing transversely outward surfaces characterized as a face side surface on one side and a far side surface on the other, said elongated mainframe having an interior frame structure consisting essentially of two interior plates spaced from each other and from the end plates, with said interior plates lying in planes parallel to the planes of the end plates and united to the base and header bars, and two X braces of substantially equal configuration, with a said X brace between each end plate and the interior plate most adjacent thereto and having the lower arms of the X brace united at their termini to the base bar at intersections formed by a said plate with the base bar, and having the upper arms of the X brace united at their termini to the header bar at intersections formed by a said plate with the header bar, the central portion of the elongated mainframe embracing the two interior plates being characterized as the medial portion thereof, three-point means for receiving a three-point hitch of a tractor, said three-point means being located medially on the mainframe, the three-point means consisting essentially of an upper bracket means medially rigidly fixed on the header bar for receiving the upper link of a three-point hitch and a pair of spaced lower bracket means united to the base bar for receiving the pair of lower links of a three-point hitch, and bale-supporting teeth mounted on the base bar and extending perpendicularly outward from the face side surface of the mainframe, said teeth being adapted to carry more than one bale with the bales carried in laterally spaced relationship with respect to each other.

2. The bale carrier of claim 1 wherein a said bale-supporting tooth is located proximate to each said plate member of the mainframe.

3. The bale carrier of claim 1 wherein the lower arms of each X brace are united to the base bar at a location proximate to the far side surface of the base bar, with the X brace extending upwardly in a relatively tilted relationship toward the face side surface of the mainframe.

4. The bale carrier of claim 3 wherein the upper arms of each X brace are united to the header bar at a location proximate to the face side surface of the header bar.

5. The bale carrier of claim 1 wherein the upper arms of each X brace are united to the header bar at a location proximate to the face side surface of the header bar.

6. The bale carrier of claim 1 wherein each lower bracket means for receiving the lower links of a three-point hitch comprises an ear member and an interior plate in cooperatively spaced relationship.

7. The bale carrier of claim 1 wherein the bale-supporting teeth extend perpendicularly outward from a location below the base bar, are pivotally mounted on the base bar at a location below but proximate to the face side surface of the base bar for floating action in a vertical plane, with each tooth having a heel continuation thereof extending underneath the base bar and within a pivot-limiting frame depending downwardly at a location proximate to the far side surface of the base bar.

8. The bale carrier of claim 7 wherein the mounting location from which each tooth extends perpendicularly outward is proximate to a said plate member of the mainframe.

9. The bale carrier of claim 8 wherein the lower arms of each X brace are united to the base bar at a location proximate to the far side surface of the base bar, with the X brace extending upwardly in a relatively tilted relationship toward the face side surface of the mainframe.

10. The bale carrier of claim 7 wherein the bale-supporting teeth are four in number and consist of two pairs, each pair being adapted to carry a bale, and wherein the mounting location from which each tooth extends perpendicularly outward is proximate to a said plate member of the mainframe.

11. A bale carrier of elongated character for three-point hitch counting on a tractor so as to extend transversely to the direction of travel by the tractor, comprising a unitary elongated mainframe having a rectangular perimeter the longer of which are formed by a lower horizontal base bar which has an upper inwardly facing surface of generally plate-like character and an upper header bar which has a lower inwardly facing surface of generally plate-like character, and the shorter members of which are formed by end plates lying in planes perpendicular to the base and header bars, the members of said rectangular perimeter having opposing transversely outward surfaces characterized as a face side surface on one side and a far side surface on the other, said elongated mainframe having an interior frame structure comprising two interior plates spaced from each other and from the end plates, with said interior plates lying in planes parallel to the planes of the end plates and united to the base and header bars, and two x braces of substantially equal configuration, with a said x brace between each end plate and the interior plate most adjacent thereto and having the lower arms of the x brace united at their termini to the base bar at intersections formed by a said plate with the base bar, and having the upper arms of the x brace united at their termimi to the header bar at intersections formed by a said plate with the header bar, the central portion of the elongated mainframe embracing the two interior plates being characterized as the medial portion thereof, three-point means for receiving a three-point hitch of a tractor, said three-point means being located medially on the mainframe, the three-point means consisting essentially of an upper bracket means medially located on the header bar for receiving the upper link of a three-point hitch and a pair of spaced lower bracket means united to the base bar for receiving the pair of lower links of a three-point hitch, and bale-supporting teeth mounted on the base bar and extending perpendicularly outward from the face side surface of the mainframe, said teeth being adapted to carry more than one bale with the bales carried in laterally spaced relationship with respect to each other, said teeth being characterized further in that they extend perpendicularly outward from a location below the base bar, are pivotally mounted on the base bar at a location below but proximate to the face side surface of the base bar for floating action in a vertical plane, with each tooth having a heel continuation thereof extending underneath the base bar within a pivot-limiting frame depending downwardly at a location proximate to the far side surface of the base bar.

12. The base carrier of claim 11 wherein the mounting location from which each tooth extends perpendicularly outward is proximate to a said plate member of the mainframe.

13. The base carrier of claim 11 wherein the lower arms of each x brace are united to the base bar at a location proximate to the far side surface of the base bar, with the x brace extending upwardly in a relatively tilted relationship towared the face side surface of the mainframe.

14. The bale carrier of claim 13 wherein the upper arms of each x brace are united to the header bar at a location proximate to the face side surface of the header bar.

15. The bale carrier of claim 11 wherein the upper arms of each x brace are united to the header bar at a location proximate to the face side surface of the header bar.

16. The bale carrier of claim 11 wherein each lower bracket means for receiving the lower links of a three-point hitch comprises an ear member and an interior plate in cooperatively spaced relationship.

17. The bale carrier of claim 11 wherein the bale-supporting teeth are four in number and consist of two pairs, each pair being adapted to carry a bale, and wherein the mounting location from which each tooth extends perpendicularly outward is proximate to a said plate member of the mainframe.

* * * * *

UNITED STATES PATENT AND TRADEMARK OFFICE
CERTIFICATE OF CORRECTION

PATENT NO. : 4,537,549

DATED : August 27, 1985

INVENTOR(S) : K.J. Knels

It is certified that error appears in the above—identified patent and that said Letters Patent is hereby corrected as shown below:

In the Abstract:

line 14, "bas" should be --base--.

In the Patent (each correction below is in the claims):

Col. 8, line 6, "counting" should be --mounting--.

Col. 8, line 10, should read "perimeter the longer members of which are formed by a"

Col. 8, line 33, "termimi" should be --termini--.

Col. 8, line 60, should read "underneath the base bar and within a pivot-limiting"

Col. 8, line 63, "base" should be --bale--.

Col. 8, line 67, "base" should be --bale--.

Col. 9, line 4, "towared" should be --toward--.

Signed and Sealed this

Fifth Day of November 1985

[SEAL]

Attest:

DONALD J. QUIGG

Attesting Officer

Commissioner of Patents and Trademarks